US007716338B1

(12) United States Patent
Sylvain

(10) Patent No.: US 7,716,338 B1
(45) Date of Patent: May 11, 2010

(54) REHOMING VIA TUNNEL SWITCHING

(75) Inventor: Dany Sylvain, Gatineau (CA)

(73) Assignee: Avaya, Inc., Basking Ridge, NJ (US)

( * ) Notice: Subject to any disclaimer, the term of this patent is extended or adjusted under 35 U.S.C. 154(b) by 1901 days.

(21) Appl. No.: 10/693,807

(22) Filed: Oct. 24, 2003

(51) Int. Cl.
*G06F 15/16* (2006.01)

(52) U.S. Cl. .................. 709/227; 709/217; 709/203

(58) Field of Classification Search .......... 709/203, 709/217–219, 224, 227
See application file for complete search history.

(56) References Cited

U.S. PATENT DOCUMENTS 7,020,464 B2 * 3/2006 Bahl et al. ............ 455/432.1
7,131,141 B1 * 10/2006 Blewett et al. ............ 726/12
7,237,260 B2 * 6/2007 Yu et al. .................. 726/11
2003/0110288 A1 * 6/2003 Ramanujan et al. ....... 709/238

* cited by examiner

*Primary Examiner*—Salad Abdullahi
*Assistant Examiner*—El Hadji M Sall
(74) *Attorney, Agent, or Firm*—Withrow & Terranova, PLLC

(57) ABSTRACT

The present invention provides a tunnel access server facilitating communications between a user element and protected network resources, wherein a tunneling session is established between the tunnel access server and the user element. To allow the user element to send packets to a protected network resource, the tunnel access server will send a target network address to the user element, and the user element will use the target network address for sending packets to the protected network resource. The packets intended for the protected network resource are initially sent to the tunnel access server via the existing tunneling session. When the user element moves from one access network to another, the tunnel access server will reserve the target network address previously assigned to the user element and reassign the target network address to the user element over a second tunneling session established over the new access network.

32 Claims, 4 Drawing Sheets

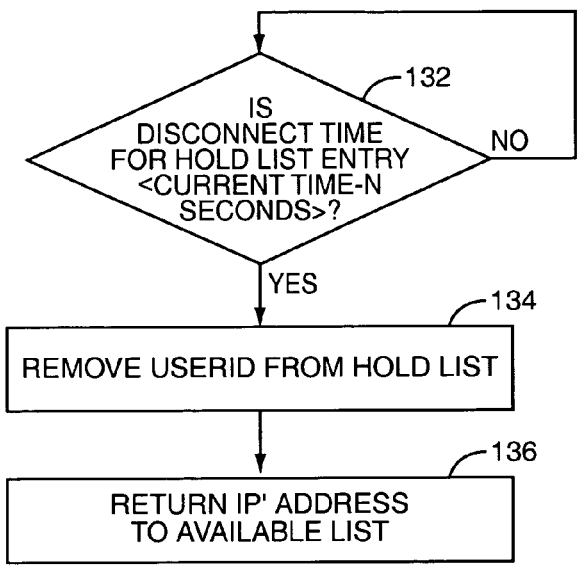
*FIG. 2B*
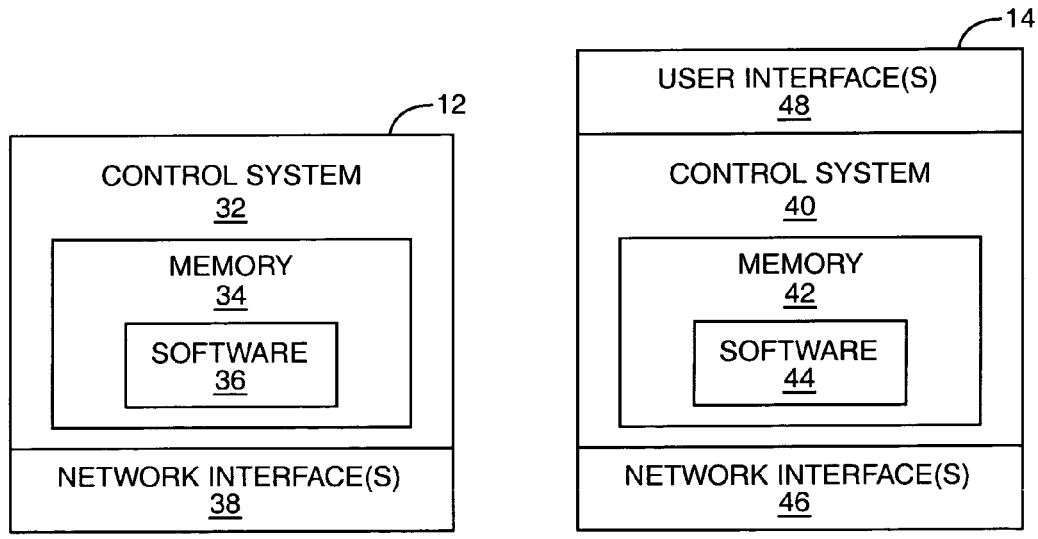
*FIG. 4*        *FIG. 5*

REHOMING VIA TUNNEL SWITCHING

FIELD OF THE INVENTION

The present invention relates to communications, and in particular to allowing applications running on a user terminal to communicate with protected network resources using a common Internet Protocol (IP) address as the user terminal moves from one access network to another.

BACKGROUND OF THE INVENTION

Expansion of packet-based networks, such as the Internet, is extending into mobile environments. Accordingly, user terminals equipped with wireless communication capability can now establish communication sessions with public or protected network resources in part over wireless communication channels. Public network resources are generally accessible by any user using a public network such as the Internet. Protected network resources have restricted access, wherein only authorized user terminals can reach them. This is generally the case for enterprise networks, generally referred as intranets, which may be interconnected to the public Internet but usually through firewalls and network address translators (NAT) to support only authorized access to the protected network resources and to allow the use of private network addressing.

There are numerous wireline and wireless communication networks using different communication technologies and protocols. In an effort to increase functionality, the user terminals may be equipped to communicate with different types of networks using different access technologies. With such capabilities, the user terminals may remain mobile and establish sequential connections over different access networks as the user element moves from one access network to another.

Although basic communication sessions can be established in a dynamic fashion as the user terminal moves, applications relying on communications with the network resources need to be restarted once the user terminal is supported by a new access network. The restarting of the applications is necessary because the network resources or elements acting as a proxy therefor will assign different IP addresses to use for communications via different access networks. Thus, an application running on the user terminal will have a first IP address for communicating with network resources via a first access network and a second IP address for communicating with the same network resources via a second access network. When the application restarts, the necessary handshaking with the network resources is provided to have the network resources or proxies therefor provide an appropriate IP address to which the application should send packets. Given the inconvenience of having to restart applications when the user terminal moves from one access network to another, there is a need for a simple technique by which applications can communicate with the protected network resources in a direct or indirect fashion using a common IP address and without requiring restarting of the application, or otherwise by obtaining a unique IP address to communicate via the new access network.

The IETF MobileIP standard, RFC3244, specifies how basic mobility across access networks can be achieved while preserving a common IP address for the user terminal applications when accessing public network resources. Various enhancements to RFC3244 have been standardized to facilitate mobility when a user terminal communicates with protected network resources. RFC 3024 specifies symmetrical tunnels for communication but doesn't address NAT and firewall traversal issues. RFC 3519 adds an additional UDP (user datagram protocol, RFC 768) protocol layer to allow NAT traversal but adds extra protocol headers and doesn't address firewall traversal. RFC 2356 describes how MobileIP can traverse one specific type of firewall, but is not compatible with IPSec (IP security, RFC 2406, RFC 2402), the preferred mechanism for securing access to private networks via a public network. Thus, there is a further need to allow for firewall, NAT, encryption and private IP addressing, as well as a need to minimize the equipment needed and to fit into existing practices used to access private networks via a public network.

SUMMARY OF THE INVENTION

The present invention relates to using a tunnel access server to facilitate communications between a user element and one or more protected network resources, wherein a tunneling session is established between the tunnel access server and the user element via one or more intermediate access networks. Tunnel access servers are commonly used to secure access to protected network resources for user elements connected via a public network, but do not currently allow the user elements to move and start using different public addresses. Tunnel access servers may provide a firewall for the private network with strict user authentication, while supporting NAT and data encryption. To allow the user element to send packets to a protected network resource, the tunnel access server will initially send a target network address to the user element, and the user element will use the target network address for sending packets to the protected network resource via the tunnel access server. The packets intended for the protected network resource are initially sent to the tunnel access server via the existing tunneling session. When the user element moves from one access network to another, the tunnel access server will reserve the target network address previously assigned to the user element and reassign the target network address to the user element over a second tunneling session established over the new access network. As such, applications running on the user element do not have to be restarted or take other actions to accommodate using a different target network address for sending packets to the protected network resource.

In one embodiment, the target network address for a previous tunneling session is only reserved for a predetermined amount of time after the first tunneling session is terminated or from a time when the first tunneling session was last used. If the length of time to establish and use the second tunneling session exceeds the predetermined amount of time, the tunnel access server will assign a new target network address for the user element to use for sending packets to the protected network resource. When a new target network address is assigned to the user element, applications on the user element will likely need to be restarted or otherwise manipulated such that the new target network address will be used for sending packets to the protected network resource.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2B is a flow diagram illustrating a background process provided by the tunnel access server according to one embodiment of the present invention.

FIG. 4 is a block representation of a tunnel access server according to one embodiment of the present invention.

FIG. 5 is a block representation of a user element according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
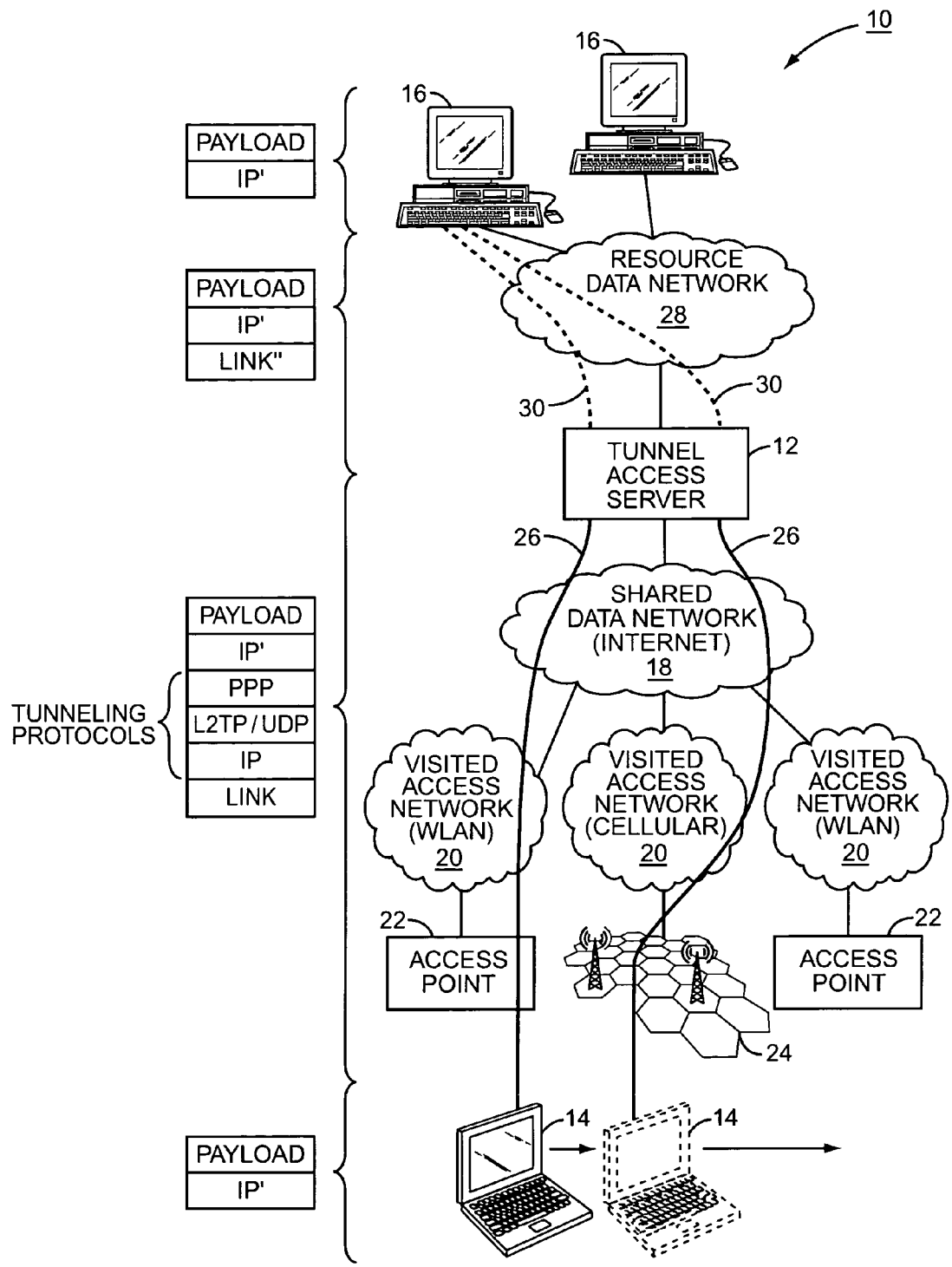
FIG. 1 illustrates a communication environment according to one embodiment of the present invention.

The present invention allows applications running on a user terminal to use a common IP address when communicating with a particular protected network resource as the user terminal moves from one access network to another. As illustrated in FIG. 1, a communication environment 10 includes a tunnel access server 12, which facilitates communications between a user element 14, such as a mobile terminal, personal computer, personal digital assistant, or other computing devices, and one or more protected network resources 16 over a shared data network 18, such as the Internet. Access to the shared data network 18 by the user elements 14 is provided by multiple visited access networks 20, which may support communications with the user element 14 in a wired or wireless fashion using one or more access technologies. As illustrated, the left and rightmost visited access networks 20 are wireless local area networks (WLANs) facilitating wireless communications with the user element 14 via a WLAN access point 22. The middle visited access network 20 is illustrated as a cellular network, wherein communications with the user element 14 may be facilitated via a network of base stations 24, which are merely cellular access points for the visited access network 20.

When communicating with the protected network resources 16, a communication client on the user element 14 will cooperate with the tunnel access server 12 to establish a communication tunnel 26 between the tunnel access server 12 and the user element 14. The communication tunnel 26 may take many forms, wherein communications between the tunnel access server 12 and the user element 14 take place in a defined manner or over a defined path. For example, the communication tunnel 26 may be a Virtual Private Network (VPN) tunnel or similar communication path. In turn, the tunnel access server 12 will establish communications with the protected network resources 16 over a resource data network 28 via any type of packet data path 30.

In general, when a communication application running on the user element 14 needs to send packets to a particular protected network resource 16, the tunnel access server 12 will provide a target network address IP' via the current communication tunnel 26. Once the IP address IP' is received, the application can send data packets toward the protected network resource 16 via the tunnel access server 12. The packets are sent to the tunnel access server 12 using a tunnel IP address (IP) and any associated tunneling and session protocols, such as the User Datagram Protocol (UDP), Layer 2 Tunneling Protocol (L2TP), and Point-to-Point Protocol (PPP), as illustrated. Upon receipt of the data packets, the tunnel access server 12 will remove the encapsulation layers and forward the data packets to the protected network resource 16 using the target network address IP' as the source address. In the reverse direction, the protected network resource 16 will send packets to the target network address IP' operated by the tunnel access server 12, which will encapsulate the data into the appropriate communication tunnel 26 with a destination address IP. The user element 14 will then remove the encapsulation and present the data to the appropriate application using the IP' address. Prior to the present invention, a new target network address for allowing the application to communicate with the particular protected network resource 16 was required each time a communication tunnel 26 was established. In general, a new communication tunnel 26 was established each time the user element 14 moved from one location to another, wherein communications with the tunnel access server 12 must be facilitated by a different visited access network 20. Since a new target network address was required, currently running applications had to be restarted to obtain the new target network address, because most applications are unable to switch target network addresses during operation.

For the present invention, the tunnel access server 12 temporarily stores a target network address being used by an application on a user terminal 14, and will reassign the same target network address to the application when a new communication tunnel 26 is established within a given period of time. Accordingly, as the user terminal 14 moves from one visited access network 20 to another, one communication tunnel 26 can be broken down as a new communication tunnel 26 is created. During this process, the tunnel access server 12 will reserve the target network address used over the old communication tunnel 26 and assign it back to the application for use over the new communication tunnel 26. The tunnel access server 12 will take the necessary steps to verify the application or user terminal 14, preferably using a user identifier (ID) associated therewith prior to reassigning the target network address for use over the new communication tunnel 26. With the present invention, application data, or the payload, in a transferred packet can effectively be sent from the user terminal 14 to the protected network resource 16. As illustrated to the left of FIG. 1, the application or client running on the user element 14 can configure packets having a payload and intended for a target network address. Using a particular link layer associated with the access technology, various tunneling and other protocols may be used to carry and encrypt the payload and target network address to the tunnel access server 12 using the tunnel access server address (IP). As noted, the tunnel access server 12 will forward the payload to the protected network resource 16 associated with the target network address using an appropriate link layer ("Link") access protocol.

Figure 2A:
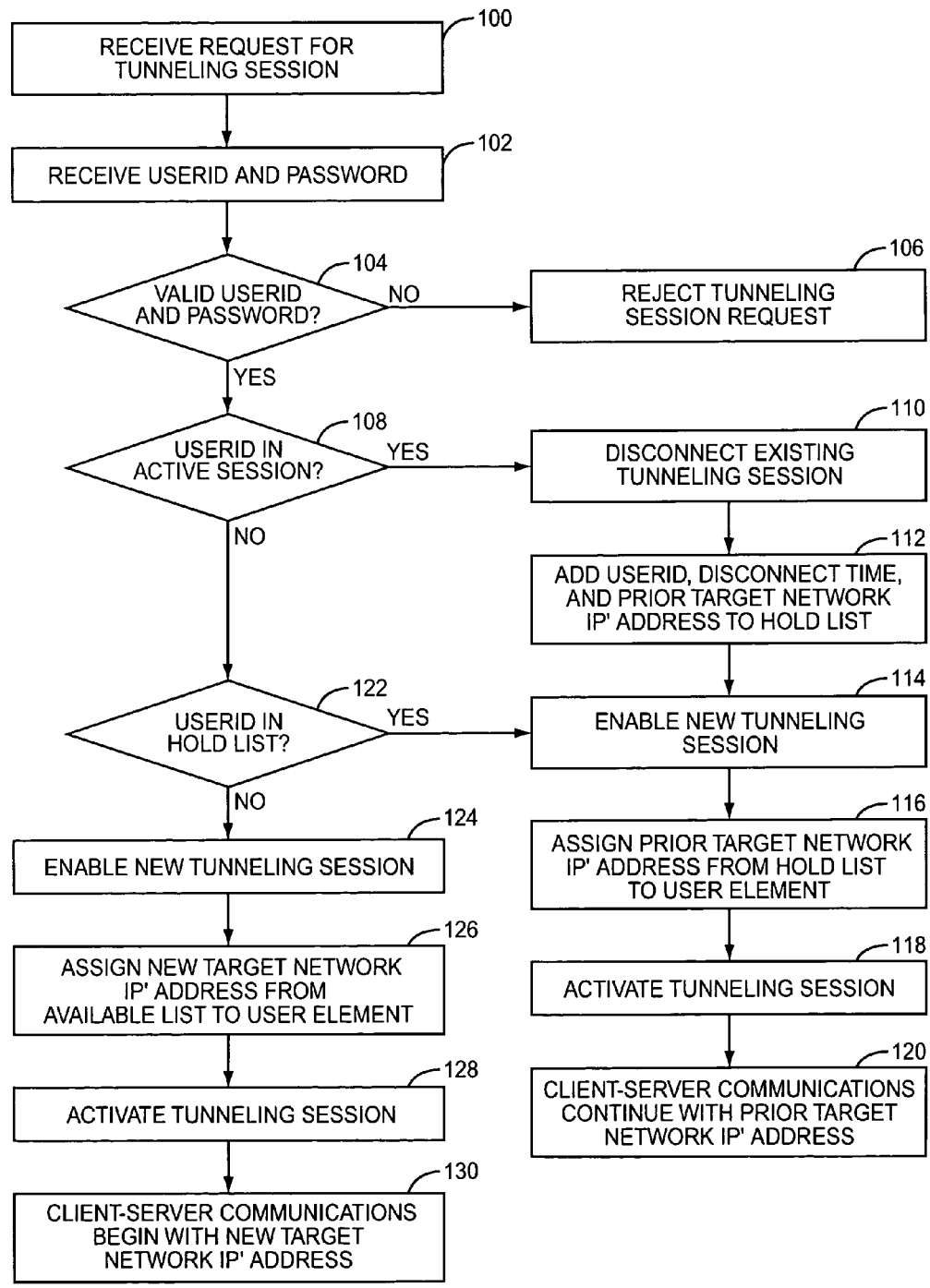
FIG. 2A is a flow diagram providing an overview of the basic operation of a tunnel access server according to one embodiment of the present invention.

With reference to FIG. 2A, a basic operation of the tunnel access server 12 is described according to one embodiment of the present invention. Initially, a tunneling request from the user element 14 is received at the tunnel access server 12 (step 100). The tunnel access server 12 will also receive a user ID and password, within the request or subsequent to the request, to authenticate the user element 14 (step 102). If the user ID or password are invalid (step 104), the tunnel access server 12 will reject the tunneling session request (step 106). If the user ID and password are valid (step 104), the tunnel access server 12 will determine if the user ID is associated with a user element 14 involved in an active tunneling session (step 108). If there is an active session associated with the user element 14 when a new request for a tunneling session is received, the tunnel access server 12 will disconnect the existing tunneling session (step 110), and add the user ID, disconnect time, and prior target network IP' address to a hold list (step 112). In one embodiment, this last step is provided each time an existing tunneling session is disconnected. Next, a new tunnel 26 is created to enable a new tunneling session (step 114). The tunnel access server 12 will then assign the prior target network address from the hold list to the user element 14 using the user ID (step 116), wherein the tunneling session is activated (step 118) and client-server communications can continue using the prior target network address (step 120). Accordingly, the prior target network address from the previous tunneling session is assigned to the user element 14 in a subsequent tunneling session.

Returning to step 108, if the user terminal 14 associated with the user ID is not in an active session, the tunnel access server 12 will determine if the user ID is stored in the hold list (step 122). If the user ID is in the hold list, the tunnel access server 12 can readily determine that the prior target network address was used in a recently disconnected tunneling session, and should be reassigned to the user element 14 when a request for a new tunneling session is received within a defined period of time, regardless of the visited access network 20 used to facilitate the tunneling session. Thus, if the user ID is in the hold list (step 122), the tunnel access server 12 will enable a new tunneling session with the user element 14 (step 114), assign the prior target network address that is stored in the hold list to the user element 14 (step 116), and activate the tunneling session (step 118), wherein communications may continue with the prior target network address (step 120).

If the user ID is not in the hold list (step 122), a new tunneling session is enabled (step 124) and a new target network address is assigned to the user element 14 associated with the user ID (step 126). Preferably, the new target network address is selected from a list of available target network addresses, which are not being held in association with the user ID stored in the hold list. Once the new target network address is provided to the user element 14, the tunneling session is activated (step 128), wherein client-server communications can begin using the new target network address between the tunnel access server 12 and the user element 14 (step 130). For these communications, the target network address is the address (IP') used for sending data to the protected network resources 16, and is not the address associated with the tunnel access server 12 (IP).

Throughout the above processes, the tunnel access server 12 will also continuously determine whether user IDs should be removed from the hold list and whether the target network addresses associated therewith should be placed on the available list. Accordingly, the tunnel access server 12 will determine whether or not a new tunneling session request is received within a predetermined amount of time from when a previous tunneling session associated with the user ID was disconnected. In the exemplary process provided in FIG. 2B, the tunnel access server 12 will determine if the disconnect time associated with the user ID in the hold list is less than the current time minus N number of seconds (step 132). As such, after N number of seconds upon disconnecting a tunneling session and without receiving a new request for a tunneling session, the tunnel access server 12 will remove the user ID from the hold list (step 134) and return the associated target network address to the available list (step 136). At this point, any tunneling sessions for the user ID will be new tunneling sessions using a new address, and the previously held address is now available to be assigned to any user element 14.

Figure 3:
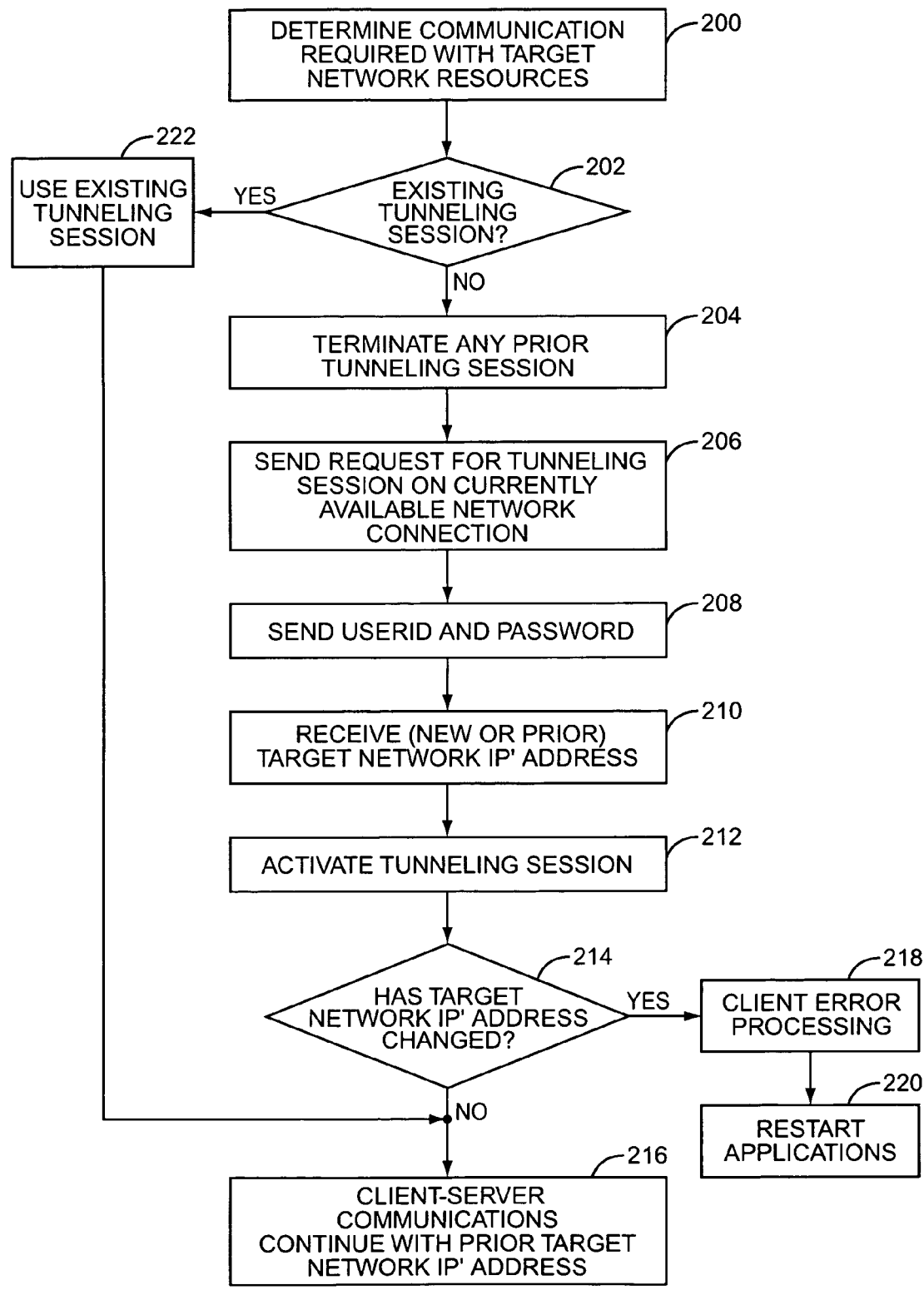
FIG. 3 is a flow diagram providing an overview of the basic operation of a communication client of a user terminal according to one embodiment of the present invention.

The basic operation of a client application in the user element 14 is described in association with the flow diagram of FIG. 3. Initially, the client application will determine whether communications are required with target protected network resources 16 (step 200). If there is not an existing functional tunneling session (step 202), the client application will terminate any prior faulty tunneling session(s) that may be in existence (step 204), and send a request for a new tunneling session on the currently available network connection via an appropriate visited access network 20 (step 206). Either with the request for the tunneling session or separate therefrom, the client application will send the user ID and password for authentication or verification (step 208), and in return, receive either a new or prior target network IP' address (step 210), depending on whether the tunnel access server 12 reserved the prior target network address for the user element 14. If the predetermined period of time from the previous tunneling session is not exceeded, the user element 14 will receive the prior target network address, and a tunneling session is activated (step 212).

The client application will then determine whether the target network address received from the tunnel access server 12 is different from that used in a previous tunneling session (step 214). If the target network address has not changed, client-server communications continue with the prior target network address (step 216). If the target network address has changed, client error processing functions or routines may be run to address any potential errors in losing a communication session, and in particular, the ability to communicate with the protected network resources 16 using the prior target network address (step 218). Next, the client application will restart any of the applications running on the user element 14 that require communications with the protected network resources 16 (step 220). If there is an existing tunneling session (step 202), the client application will continue to use the existing tunneling session and the address (IP') assigned in association with that tunneling session (step 222), wherein client-server communications will continue with the prior target network address (step 216).

With reference to FIG. 4, a tunnel access server 12 will preferably be configured with a control system 32 with sufficient memory 34 to store the software 36 necessary to facilitate the functionality described above. The control system 32 is also associated with one or more network interfaces 38 to communicate with the shared data network 18 as well as the resource data network 28.

The user element 14 may take many forms. As illustrated in FIG. 5, each of these forms will include a control system 40 with sufficient memory 42 for the software 44 necessary for controlling operation of the user element 14 as described above. The control system 40 will be associated with one or more network interfaces 46 to facilitate communications with the visited access networks 20 through their respective access points 22, including the cellular network of base stations 24. The control system 40 will also include a user interface 48, which may include a keypad, display, touch screen, or mouse to facilitate user interaction. Notably, the software 44 will include the client software as well as any of the applications communicating with the protected network resources 16.

Those skilled in the art will recognize improvements and modifications to the preferred embodiments of the present invention. All such improvements and modifications are considered within the scope of the concepts disclosed herein and the claims that follow.

What is claimed is:

1. A method for facilitating communications between a user element and a protected network resource comprising:
   a) establishing a first tunneling session with the user element via a first access network;
   b) assigning to the user element a first target network protected address for addressing packets intended for the protected network resource and traveling in part over the first tunneling session;
   c) establishing a second tunneling session with the user element via a second access network;
   d) reassigning to the user element the first target network protected address for addressing packets intended for the protected network resource and traveling in part over the second tunneling session, wherein the first target network protected address is reassigned to the user element only when the second tunneling session is established within a predetermined period of time from termination or last use of the first tunneling session; and
   e) assigning to the user element a second target network protected address for addressing packets intended for the protected network resource and traveling in part over the second tunneling session when the second tunneling session is not established within the predetermined period of time.

2. The method of claim 1 wherein the first and second tunneling sessions are encrypted tunneling sessions.

3. The method of claim 1 further comprising authenticating the first and second tunneling sessions with common authentication indicia.

4. The method of claim 1 further comprising terminating the first tunneling session and reserving the first target network protected address for the user element for the predetermined period of time for use in association with the second tunneling session.

5. The method of claim 1 further comprising:
   a) receiving a request from the user element for the second tunneling session;
   b) terminating the first tunneling session; and
   c) enabling the second tunneling session.

6. The method of claim 1 further comprising receiving the packets from the user element and forwarding the packets to the protected network resource using the first target network protected address.

7. The method of claim 1 further comprising:
   a) receiving authentication indicia from the user element; and
   b) authenticating use of the second tunneling session by the user element based on the authentication indicia.

8. The method of claim 1 wherein the first and second access networks facilitate communications with the user element using different communication technologies.

9. The method of claim 8 wherein at least one of the different communication technologies is a wireless communication technology.

10. A tunnel access server for facilitating communications between a user element and a protected network resource comprising:

a) at least one communication interface; and
b) a control system associated with the at least one communication interface and adapted to:
   i) establish a first tunneling session with the user element via a first access network;
   ii) assign to the user element a first target network protected address for addressing packets intended for the protected network resource and traveling in part over the first tunneling session;
   iii) establish a second tunneling session with the user element via a second access network;
   iv) reassign to the user element the first target network protected address for addressing packets intended for the protected network resource and traveling in part over the second tunneling session, wherein the first target network protected address is reassigned to the user element only when the second tunneling session is established within a predetermined period of time from termination or last use of the first tunneling session; and
   vi) assign to the user element a second target network protected address for addressing packets intended for the protected network resource and traveling in part over the second tunneling session when the second tunneling session is not established within the predetermined period of time.

11. The tunnel access server of claim 10 wherein the first and second tunneling sessions are encrypted tunneling sessions.

12. The tunnel access server of claim 10 wherein the control system is further adapted to authenticate the first and second tunneling sessions with common authentication indicia.

13. The tunnel access server of claim 10 wherein the control system is further adapted to terminate the first tunneling session and reserve the first target network protected address for the user element for the predetermined period of time for use in association with the second tunneling session.

14. The tunnel access server of claim 10 wherein the control system is further adapted to:
   a) receive a request from the user element for the second tunneling session;
   b) terminate the first tunneling session; and
   c) enable the second tunneling session.

15. The tunnel access server of claim 10 wherein the control system is further adapted to receive the packets from the user element and forward the packets to the protected network resource using the first target network protected address.

16. The tunnel access server of claim 10 wherein the control system is further adapted to:
   a) receive authentication indicia from the user element; and
   b) authenticate use of the second tunneling session by the user element based on the authentication indicia.

17. The tunnel access server of claim 10 wherein the first and second access networks facilitate communications with the user element using different communication technologies.

18. The tunnel access server of claim 17 wherein at least one of the different communication technologies is a wireless communication technology.

19. A method for facilitating communications between a user element and a protected network resource comprising:
   a) establishing a first tunneling session with a tunnel access server via a first access network;
   b) sending packets intended for the protected network resource over the first tunneling session using a first target network protected address;

c) establishing a second tunneling session with the tunnel access server via a second access network;
d) receiving from the tunnel access server a target network protected address for sending packets intended for the protected network resource;
e) determining if the received target network protected address is the same as the first target network protected address;
f) if the received target network protected address is the same as the first target network protected address, sending the packets intended for the protected network resource over the second tunneling session using the first target network protected address, wherein the first target network protected address is used only when the second tunneling session is established within a predetermined period of time from termination or last use of the first tunneling session; and
g) sending the packets intended for the protected network resource over the second tunneling session using a second target network protected address when the second tunneling session is not established within the predetermined period of time.

20. The method of claim 19 wherein if the received target network protected address is different than the first target network protected address, further comprising:
   a) restarting applications communicating with the protected network resource; and
   b) sending the packets intended for the protected network resource over the second tunneling session using the received target network protected address.

21. The method of claim 19 further comprising terminating the first tunneling session prior to establishing the second tunneling session.

22. The method of claim 19 further comprising:
   a) determining a need to communicate with the protected network resource;
   b) determining the first tunneling session is no longer available; and
   c) sending a request for the second tunneling session to the tunnel access server via the second access network.

23. The method of claim 22 further comprising sending authentication indicia for authenticating the user element to the tunnel access server.

24. The method of claim 19 wherein communications with the first and second access networks are facilitated using different communication technologies.

25. The method of claim 24 wherein at least one of the different communication technologies is a wireless communication technology.

26. A user element for facilitating communications with a protected network resource via a tunnel access server comprising:
   a) at least one communication interface; and
   b) a control system associated with the at least one communication interface and adapted to:
      i) establish a first tunneling session with the tunnel access server via a first access network;
      ii) send packets intended for the protected network resource over the first tunneling session using a first target network protected address;
      iii) establish a second tunneling session with the tunnel access server via a second access network;
      iv) receive from the tunnel access server a target network protected address for sending packets intended for the protected network resource;
      v) determine if the received target network protected address is the same as the first target network protected address;
      vi) if the received target network protected address is the same as the first target network protected address, send the packets intended for the protected network resource over the second tunneling session using the first target network protected address, wherein the first target network protected address is used only when the second tunneling session is established within a predetermined period of time from termination or last use of the first tunneling session; and
      vii) send the packets intended for the protected network resource over the second tunneling session using a second target network protected address when the second tunneling session is not established within the predetermined period of time.

27. The user element of claim 26 wherein, if the received target network protected address is different than the first target network protected address, the control system is further adapted to:
   a) restart applications communicating with the protected network resource; and
   b) send the packets intended for the protected network resource over the second tunneling session using the received target network protected address.

28. The user element of claim 26 wherein the control system is further adapted to terminate the first tunneling session prior to establishing the second tunneling session.

29. The user element of claim 26 wherein the control system is further adapted to:
   a) determine a need to communicate with the protected network resource;
   b) determine the first tunneling session is no longer available; and
   c) send a request for the second tunneling session to the tunnel access server via the second access network.

30. The user element of claim 26 wherein the control system is further adapted to send authentication indicia for authenticating the user element to the tunnel access server.

31. The user element of claim 26 wherein communications with the first and second access networks are facilitated using different communication technologies.

32. The user element of claim 31 wherein at least one of the different communication technologies is a wireless communication technology.

* * * * *